Samuel Johnston.
Mowing Machine.

116315  PATENTED JUN 27 1871

Witnesses
Alex McMahon
H. H. Doubleday

Samuel Johnston
by A. M. Smith atty.

UNITED STATES PATENT OFFICE.

SAMUEL JOHNSTON, OF BROCKPORT, NEW YORK, ASSIGNOR TO JAMES S. THAYER, OF NEW YORK CITY.

IMPROVEMENT IN MOWING-MACHINES.

Specification forming part of Letters Patent No. 116,315, dated June 27, 1871.

*To all whom it may concern:*

Be it known that I, SAMUEL JOHNSTON, of Brockport, county of Monroe and State of New York, have invented certain new and useful Improvements in Mowing-Machines, of which the following is a full, clear, and exact description, reference being had to the accompanying drawing making part of this specification, in which—

Figure 1:
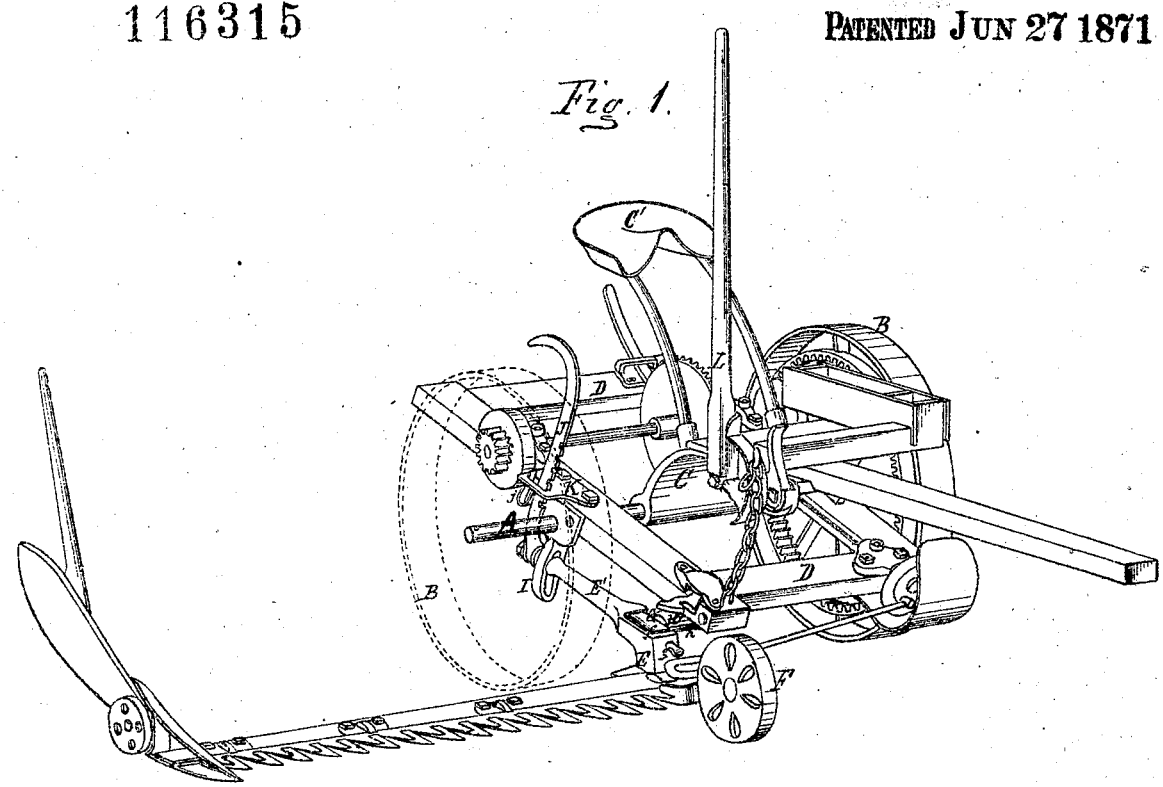
Figure 2:
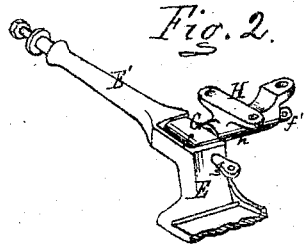

Figure 1 is a perspective view of a harvesting-machine with the inner drive-wheel removed (its position being shown in dotted lines) for showing my improvements, and Fig. 2 is a similar view of the main shoe and double-acting or cross-hinge piece which connects the shoe with the frame.

Similar letters refer to corresponding parts in both figures.

The invention relates: First, to a novel manner of combining the main shoe, which carries the cutting apparatus, with the vibrating frame by means of a double or cross-acting stop-hinge connection, which permits the cutting apparatus to follow or conform to the surface of the ground in mowing, or to be folded for transportation, and also admits of the adjustment of the angle of presentation of the fingers and cutters to the crop to adapt them to the varying position or angle of the cutter-frame, while at the same time it enables the cutting apparatus to be raised bodily for passing obstructions. It further relates to the combination, with the pivoted main shoe, of an adjusting-slide or rack for holding the shoe and cutting apparatus at any desired angle of adjustment.

In the accompanying drawing, A represents the main axle; B, the drive-wheels; C, the vibrating tongue and seat-frame; and D, the vibrating cutter-frame. E is the main shoe, consisting of a lower runner or shoe-part proper, to which the inner end of the finger-bar is bolted, and of an upper or shank portion, E′, through which connection is made with the main or vibrating frame, as hereinafter explained. The point of the shoe or runner is armed with a friction-wheel or roller, F, arranged in advance of the cutters, and the divider at the outer end of the finger-bar also carries a friction-roller in rear of the finger-bar, as shown. The shank E′ of the shoe is provided at or near its forward end with a socket or recess, open at the top and inner side of said shank, in which is fitted the cross-head or end $f$ of a T-shaped double hinge or pivot, G, secured in place by a pin or bolt, $g$. The shank $f'$ of cross-head or pivot G is mounted in a sleeve-bearing, $h$, formed in a bracket, H, bolted to the inner front corner of the main or vibrating frame D, and forms the pivot on which the angle of presentation of the cutters to the ground is adjusted as required. I is a stirrup or loop attached to the main or vibrating frame D, at or near the axle, and in which the rear end of the shank of the main shoe E vibrates or is adjusted vertically for rocking the shoe on pivot $f$. To the rear end of the shank E′ of the main shoe E is attached an upright rod, J, extending upward above the frame to within convenient reach of the driver on seat C′, the upper end of said rod being bent, as shown, or provided with a handle for the convenience of the driver in operating the same. One edge or face of rod J is provided with a rack or series of notches, which serves to engage it at any desired point with a slotted plate, K, bolted to the frame D, and through which the rod or rack passes. A flat spring, $j$, holds the rack J engaged with the plate K when not forced out by the hand of the driver. L represents a hand-lever provided with a grooved segment applied to the tongue-frame or plate C, and connected by a cord or chain with the vibrating frame D, for adjusting the same in the usual manner for passing obstructions or changing the height of cut.

From the foregoing description it will be seen that, when the frame D is vibrated by means of lever L for changing the height of cut or for passing obstructions, the motion of said frame around the axle as a center causes a change in the angle of presentation of cutters to the crop, sometimes injuriously affecting the action of the cutters. To remedy this it is simply necessary to release the rod or rack J and to raise or depress the same, vibrating the main shoe on its pivotal connection $f'$ with the frame D, thereby setting the cutters at any desired angle. The joint between the main shoe and cross-head G is such as to permit the outer end of the cutting apparatus to be freely raised for transportation, while at the same time it is so constructed as to act as a butt-hinge or joint for preventing the outer end of the cutting apparatus from dropping but slightly, if any, below the point to which the inner end may be set or adjusted. By this arrangement the driver is enabled to lift the cutting apparatus bodily, for passing obstructions or other purposes, by simply vibrating or adjusting the frame D.

Having now described my invention, what I claim as new, and desire to secure by Letters Patent, is—

1. The double or cross-acting stop-hinge G, constructed substantially as described, in combination with the main shoe E and main or vibrating frame D, substantially as described.

2. The hinge G and pendent loop I, in combination with the main shoe E for connecting said shoe to the main or vibrating frame D and permitting its rocking and vibrating movements, substantially as described.

3. The main shoe, connected with the frame as described, in combination with the adjusting-rod or rack J, arranged and operating substantially as described.

SAML. JOHNSTON.

Witnesses:
F. S. STEBBINS,
M. M. OLIVER.